April 26, 1938. B. WALKER Re. 20,707

VEHICLE LIFTING AND TRAVERSING DEVICE

Original Filed June 26, 1933 3 Sheets-Sheet 1

12

INVENTOR.
Booth Walker

April 26, 1938. B. WALKER Re. 20,707

VEHICLE LIFTING AND TRAVERSING DEVICE

Original Filed June 26, 1933 3 Sheets-Sheet 2

INVENTOR.
Brooks Walker

April 26, 1938. B. WALKER Re. 20,707

VEHICLE LIFTING AND TRAVERSING DEVICE

Original Filed June 26, 1933 3 Sheets-Sheet 3

INVENTOR.

Brooks Walker

Reissued Apr. 26, 1938 Re. 20,707

UNITED STATES PATENT OFFICE 20,707

VEHICLE LIFTING AND TRAVERSING DEVICE

Brooks Walker, Piedmont, Calif.

Original No. 2,054,842, dated September 22, 1936, Serial No. 677,565, June 26, 1933. Application for reissue March 20, 1937, Serial No. 133,095.

11 Claims. (Cl. 180—1)

This invention relates to a vehicle lifting and traversing device, and particularly to the simplification of such a device which employs an auxiliary wheel or wheels to lift one end of the vehicle so that it can be pushed or driven in an arc about a point adjacent the opposite end thereof.

In my issued U. S. Patents Nos. 1,693,288, 1,742,566, 1,884,932 and 1,884,933 I have described and claimed a lifting and traversing device using one or two wheels connected to the vehicle driving means for traversing and lifting the vehicle by motor power by very complete mechanisms. My present invention relates to a simplification of the mechanism to a greatly reduced number of parts where such a device is to be used on the less expensive vehicles of lighter construction and particularly applicable to use on toy automobiles, trucks, etc. though the construction shown here is applicable to all classes of vehicles.

The main objects of the invention are to greatly reduce the weight, cost and complication of a vehicle lifting device on which the vehicle can be traversed in a circle about a point adjacent the opposite end thereof; to actuate the device from the exterior of the vehicle; to provide a construction requiring little or no machine work on the parts; to provide a construction applicable to toy construction; to provide a structure capable of being fabricated of rods and stampings, to form a lifting handle integral with the lifting link; to support the auxiliary wheel on an axle in alignment with the vehicle axle; to provide means for driving the auxiliary wheel through said axle; to eliminate a shifting of gears to engage the driving mechanism of said auxiliary wheel; to utilize the axle as a lifting spring to hold the mechanism in its inactive position.

Other objects and features of novelty of my invention will be either specifically pointed out or will become apparent when referring, for a better understanding of my invention, to the following description in conjunction with the accompanying drawings, which:

Figure 1:
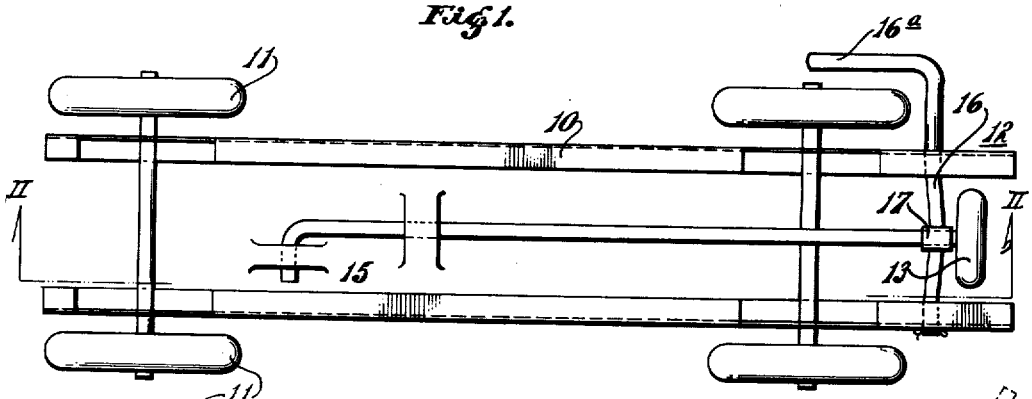
Figure 1 is a bottom plan view of a vehicle chassis provided with a lifting and traversing device embodying the features of my invention.
Figure 2:
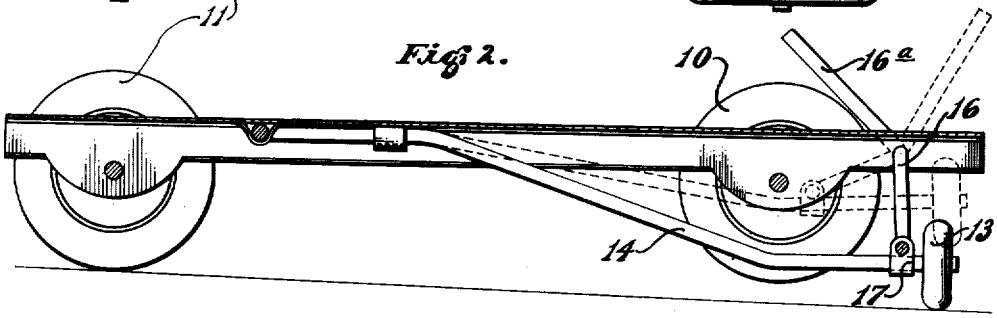
Figure 2 is a side elevation view, partly in section, of the device illustrated in Figure 1 taken at section 2—2.

In Figures 1 and 2, I have illustrated a vehicle chassis 10 and a lifting and traversing device 12, which is provided with a single wheel 13, upon which the vehicle is raised and can be traversed in an arc about a point at the opposite end of the vehicle. The shaft 14 is rigidly attached to the vehicle chassis by means of the clips 15 which clips are formed integral with the vehicle chassis. The vehicle chassis 10 is provided with regular vehicle supporting wheels 11 for forward motion. A link 16 is pivotally mounted in the frame 10 at both sides thereof and engages the shaft 14 between said mountings. A stamping 17, which forms a connection between the shaft 14 and the link 16, is pivotally connected to the link 16 and is slidably connected to the shaft 14. At one side of the link 16 a crank 16A is formed integral therewith for manual operation from the vehicle exterior to rotate the link 16 to the position shown in full line of Figures 1 and 2, in which the rear end of the vehicle is supported on the rotatable wheel 13 in which position the vehicle can be pushed in a circle about a point adjacent the opposite ends thereof. When the handle is moved to the dotted position shown in Figure 2, the auxiliary wheel 13 is in its inactive position out of contact with the roadway. The anchorage of the forward end of the shaft 14 to the vehicle chassis is such as to retain the auxiliary wheel 13 in its inactive position by the resilience of the shaft 14 acting as a retracting spring, the shaft 14 being materially deflected during the raising and lowering of the wheel 13 and tending to constantly urge said wheel into its retracted position.

Figure 3:
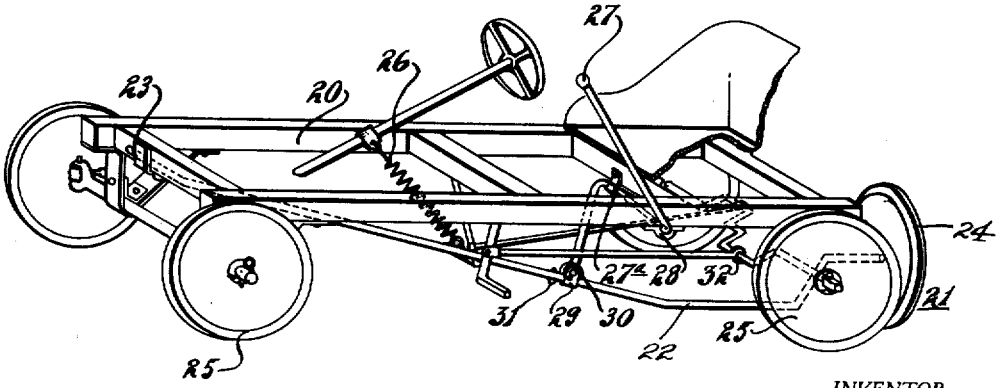
Figure 3 is a side isometric view partly in section of another form of my invention applied to a pedal type vehicle.

In Figure 3, I have illustrated a pedal propelled vehicle having a chassis 20 to which is attached a lifting and traversing device 21, which device includes a shaft 22 pivotally attached to the vehicle frame at the bearings 23 at the forward end thereof and carrying a rotatably mounted wheel 24 at the rear end thereof, said wheel 24 being interchangeable with the regular supporting wheels 25 if desired. I have shown a yieldable retaining spring 26 which constantly urges the shaft 22 and the wheel 24 into its inactive position out of contact with the roadway. However, the forward end of the shaft 22 may be rigidly attached to the vehicle chassis as was shown in connection with Figures 1 and 2 so that the shaft itself may form the retaining spring. A hand lever 27 is formed integral with a crank 27*a*, which handle and crank, are rotatably secured to the vehicle chassis by the bearings 28. The lower end of the crank 27*a* carries a roller 29 and a stamping 30 as a bearing and a retaining member respectively between the crank 27*a* and shaft 22.

A stop 31 is attached to the shaft 22 to interrupt the motion of the crank 27*a* when said crank has reached a past center position relative to said axle. A stop could, of course, be placed elsewhere as on the chassis to stop either the lever 27 or the crank 27*a* in the same position as shown in Figure 2 with the spare wheel in its active ground engaging position, supporting the rear wheels, out of contact with the roadway.

The shaft 22 is so positioned as to fall intermediate the cranks of the vehicle rear axle 32 so that wheel 24 may occupy either its raised or lowered position without interfering with the rotation of the rear axle. When the wheel 24 is in its retracted position the shaft 22 lies very close to the rear axle 32, as shown in dotted line. It is evident from the drawings and the foregoing description that I provided a lifting and traversing device of very simple construction on a vehicle of the toy automobile type, which vehicle can be operated by pedals and which device may be operated by an exteriorly operable lever to raise the rear end of the vehicle on the auxiliary wheel so that the vehicle can be pushed in a circle from outside the vehicle or from inside the vehicle by the occupant pushing sideways on the ground from within the vehicle.

In Figures 4, 5, 6 and 7, I have shown a further modification of a lifting and traversing device as applied to a vehicle. In these figures I have shown a vehicle chassis 40 on which is mounted a lifting and traversing device 41, which device includes the two wheels 42 and 43 rotatably mounted on the continuous shaft 44, which shaft is pivotally bearinged to the vehicle frame at the forward end of said shaft 44. A lifting link 45 is likewise pivotally connected to the vehicle frame at a rearward point, said link 45 being provided at one side with a handle 45*a* rigidly secured thereto or formed integral therewith. One end 45*b* of link 45 engages a hole in the vehicle frame for rotatable support while the crank end of the crank 45 is bearinged to a bracket 46 which is suitably secured to the vehicle frame by means of rivets, spot welding or other suitable means. The bracket 46 has formed integral therewith a stop 46*a* for limiting a counterclockwise rotation of the link 45 and may have a stop 46*b* for limiting the clockwise rotation of the link 45. In connection with this installation I have shown a spring loaded dash-pot 50 pivoted to the forward end 44*a* of the continuous shaft or axle 44. The dash-pot 50 carries a pre-loaded spring 51 and a piston 52, said spring constantly urging said piston and its associated rod 53 in a rearward and outward position.

Figure 4:
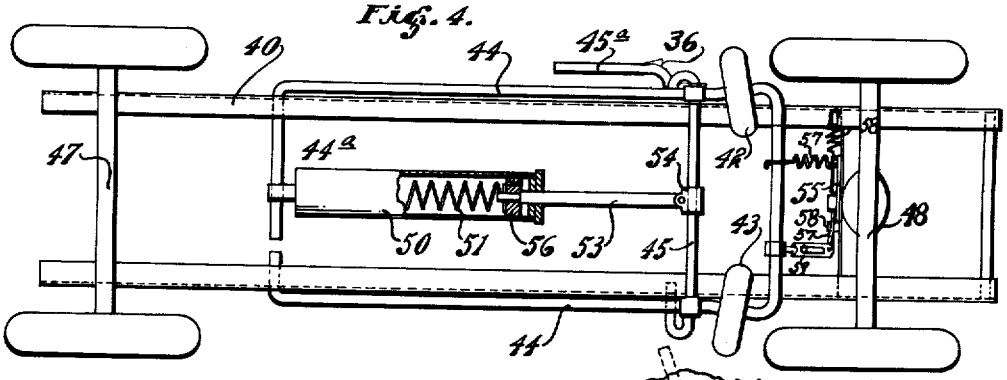
Figure 4 is a bottom plan view of a vehicle chassis partly in section with an alternative type of lifting and traversing device which embodies features of my invention.
Figure 5:
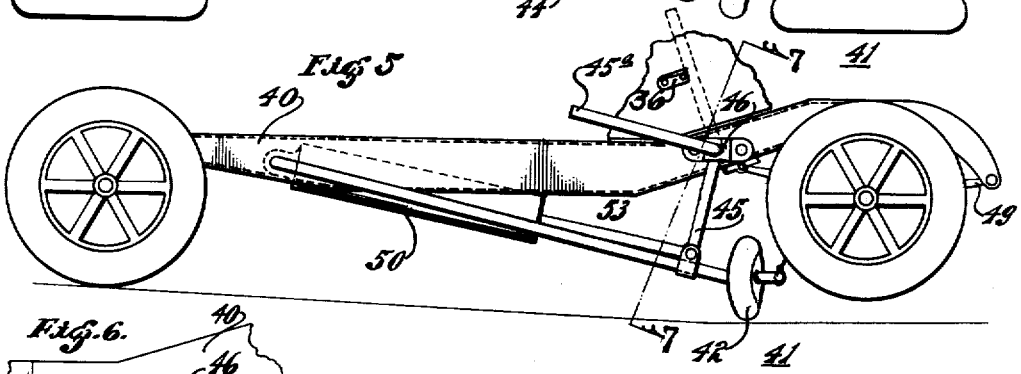
Figure 5 is a side view partially in section of the device illustrated in Figure 4.
Figure 6:
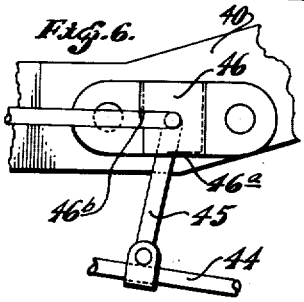
Figure 6 is an enlarged side view of the lifting link and its mounting shown in connection with Figures 4 and 5.
Figure 7:
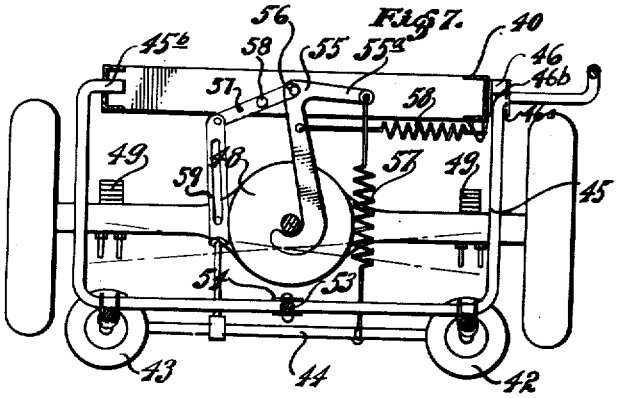
Figure 7 is an enlarged rear view taken at section 7—7 of Figure 5 showing the auxiliary wheels in their vehicle supporting position and showing the single axle lifting hook.

The piston rod 53 is suitably bearinged to the link 45 by the clip 54, said spring 51 being of sufficient strength to lift one end of the vehicle as shown in Figures 4, 5 and 7. The cylinder 50 is preferably filled with a liquid so that the piston therein acts as a dash-pot to allow a slow lifting of the vehicle on the wheels 42 and 43 to approximate the action of an engine driven hydraulic cylinder. The wheels are retracted to their inactive position by means of manually operating the lever 45*a* to engage the stop 36, which stop is rigidly secured to the vehicle chassis and so formed as to retain the lever 45*a* in a position with the auxiliary wheels in their retracted position against the force of the spring 51. By means of a slight outward force on the handle 45*a*, the handle disengages the stop 46 and the spring loaded dash-pot 50 acts to raise the vehicle on the auxiliary wheels in which position said vehicle may be pushed around in a circle. The axes of the auxiliary wheels 42 and 43 preferably intersect at a point adjacent the forward end of the vehicle as at 47 of Figure 4. In the event that the rear axle 48 of the vehicle is attached to the chassis by means of springs 49 as is the case with most full sized vehicles, I have shown a simplification of the hook means to engage the axle to cause said axle to move with the frame when the frame is moved away from the roadway by auxiliary means. In the prior art two hooks have always been used at both sides of the axle to effect this lifting operation. However in the event that the vehicle is on a warped surface the rear axle may occupy a position as shown in the dot and dash lines of Figure 7, with no additional loading of the vehicle. To assure the action of multiple hooks, I have found it necessary to allow considerable slack between each hook and normal position of the axle to take care of the warped surface condition which is encountered on numerous streets. This lost motion of the frame before the hooks lift the axle in normal operation requires an extra lifting of the vehicle which can be eliminated by means of a single central hook 55, which engages a central position of the axle by either a side motion shown best in Figure 7 or by means of a fore and aft swing not shown in this figure. It will be noted that the circular position of the axle does not change appreciably with the warping of the road surface unless the load of the vehicle is changed.

This single hook construction eliminates unnecessary parts and eliminates unnecessary lifting of the chassis before the wheels are lifted. To actuate this single hook 55, which I have shown pivoted to the link 57 at 56, I have shown a spring 57 connecting an arm 55*a* of the hook 55 to the hook rod or axle 44 so that when said rod is lowered with the vehicle wheels 42 and 43, the spring 57 will immediately urge the hook 55 into axle engagement against the action of the disengaging spring 58, which spring 58 continuously urges the hook 56 out of engagement with the vehicle axle. The spring 57 is of sufficient strength to over-power the spring 58 almost immediately when the wheels 42 and 43 start to lower and urges the hook 55 into engagement with the axle 48 well before the wheels 42 and 43 have engaged the roadway.

To further improve the action of the hook 55, I may employ a link 57 pivoted to the chassis or frame at 59 and connected to the vehicle lifting means by a lost motion linkage 59 so that after said hook 55 engages the axle 48 the link 57 will be actuated by the lost motion link 59 to raise said hook 55 relative to the vehicle frame to effect a greater ground clearance between said vehicle wheels than would otherwise be possible from a given chassis lift with standard axle hooks. It is to be understood that the lifting hook feature is equally applicable to multiple hooks or to multiple axle retaining means acting on the vehicle lifted axle. The single hook can be pivoted to the form at 56 if it is not desired to use the lifting hook feature.

Figure 8:
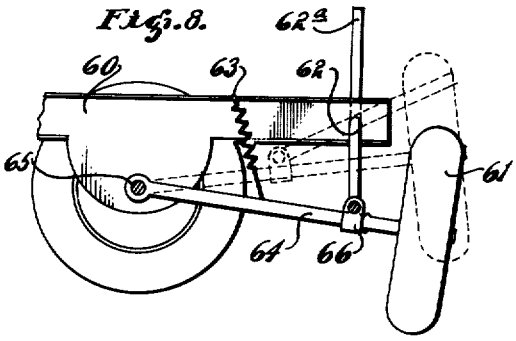
Figure 8 is a partial side view, partially in section showing an alternative type of construction embodying my invention.

In Figure 8 I have shown a further modification of my invention in which a portion of the vehicle chassis is shown at 60 and on which is mounted a lifting and traversing device consisting of an auxiliary wheel 61, rotatably mounted on an auxiliary axle 64, the forward end of which axle is pivoted to an axle of the vehicle 65. Lifting link 62 is pivotally mounted in the vehicle chassis similar to the lifting link 16 of Figure 1 and likewise has on one end thereof either rigidly attached or formed integral therewith an exteriorly operable lever 62*a*. A lifting link 62 is suitably coupled to the auxiliary axle 64 by means of the stamping 6 while a retracting spring has been shown to yieldably urge the wheel 61 into its inactive position. However, the axle 64 could be formed so as to bear against the vehicle axle 65 and continue forward to bear on the vehicle chassis so that the axle 64 could act as a retracting spring and still allow the axle 64 to suitably pivot about the vehicle axle 65. The wheel 61 may be interchangeable with the vehicle wheels or of different size as the designer sees fit.

Figure 9:
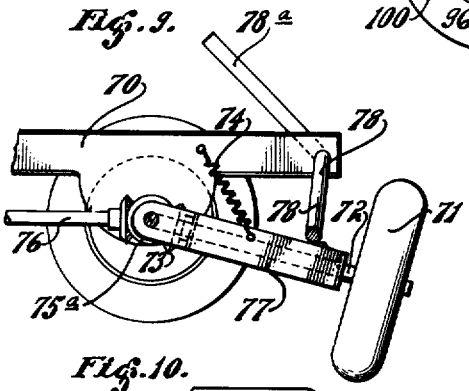
Figure 9 is a partial side view of a vehicle chassis provided with a lifting and traversing device which embodies other features of my invention.
Figure 10:
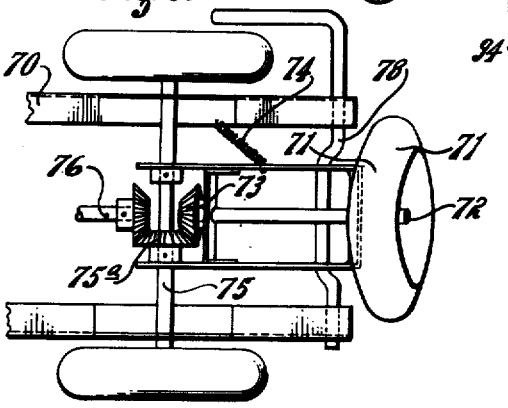
Figure 10 is a bottom plan view of the device shown in Figure 9.

In Figures 9 and 10, I have shown a further modification of my invention in which is shown a portion of a vehicle chassis 70, on which is attached a vehicle lifting and traversing device including a vehicle wheel 71, rigidly secured to an axle 72 and the forward end of which axle carries a driving means 73, which is in continuous engagement with a driving means 75*a* of the vehicle axle 75. The vehicle axle is driven by suitable means such as shaft 76 and the housing 77 is pivotally attached to the vehicle axle 75 and suitably supports the axle 72 to maintain the wheel 71 in driving engagement with the vehicle wheels which are driven by the axle 75. In the event that the rear vehicle wheels are independently sprung, universals would of course be used between the driving member 75*a* and the wheels so that the member 75*a* could be mounted on the vehicle chassis. However, what I later choose to call "axial driving means" is to be understood as meaning any final drive to the vehicle wheels whether of standard rear axle construction or of the independently sprung construction. The housing 77 is actuated toward the roadway by means of the link 78 and its associated lever 78*a* which link and lever are suitably bearinged to the vehicle frame in a manner similar to Figure 1. The portion of link 78 between its frame bearings bears upon the upper sides of the frame 77, so that rotation of lever 78*a* in a lowering direction, cams frame 77 and wheel 71 downwardly into engagement with the roadway. A yieldable spring 74 constantly urges the spare wheel and its associated axle 72 and housing 77 into their retracted position and is preferably of sufficient strength to retain said wheel secure against said vehicle without rattles when the vehicle is driven over irregular surfaces.

Figure 12:
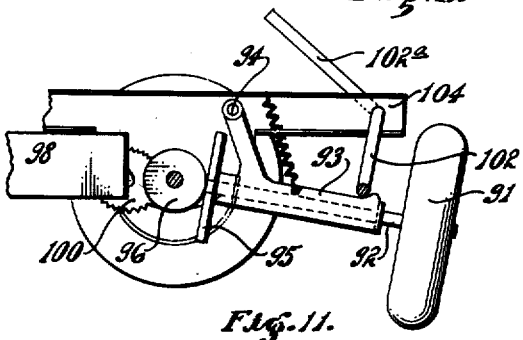
Figure 12 is a side elevation view of the mechanism shown in Figure 11.
Figure 11:
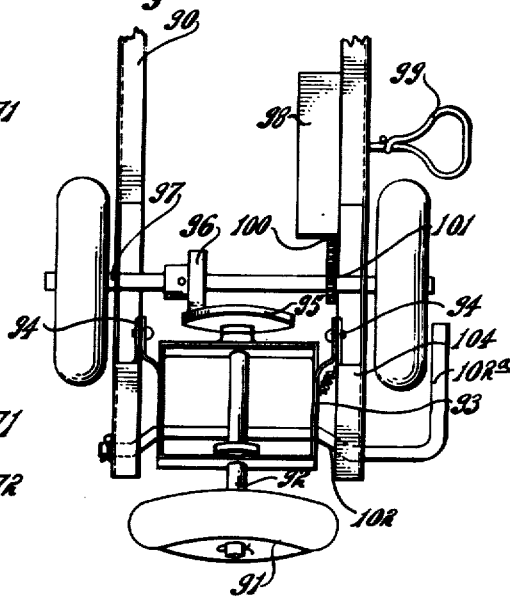
Figure 11 is a bottom plan view of the rear of a vehicle chassis provided with a lifting and traversing device embodying other features of my invention.

In Figures 11 and 12, I have shown an alternative form of my invention in which a portion of a vehicle frame is shown at 90 on which is attached a vehicle lifting and traversing device including an auxiliary wheel 91 which wheel 91 may or may not be interchangeable with vehicle wheels, said wheel being mounted on a vehicle axle 92, which axle is suitably bearinged on a housing 93, which housing is suitably pivoted to the vehicle chassis at the bearings 94. The forward end of the shaft 92 carries a friction plate 95 which friction plate 95 engages a friction drive member 96 of the vehicle axle 97 which member 96 drives at least one of said vehicle wheels. The housing 93 is so pivoted at 94 that a driving engagement is made between 95 and 96 when said auxiliary wheel 91 is in ground engagement to form a driving connection for self-propelling the vehicle in a circle from either engine source or a spring motor as shown at 98 which motor 98 is wound with the key 99 and drives through the gear 100 and the axle gear 101.

A lifting link 102 and its associated operating lever 102*a* are similar in construction to that used in Figures 9 and 10 and is likewise suitably bearinged to the vehicle frame. A yieldable spring 104 constantly urges said auxiliary mechanism into its inactive position and is of sufficient strength to retain it in its inactive position under normal operation. The bearings 94 of the housing 93 are so positioned as to cause the elements 95 and 96 to disengage when the auxiliary wheel 91 is in its inactive position.

While I have only shown an actual lifting hook in Figures 4 to 7, it is to be understood that such a hook can be incorporated with any of the other figures without departing from the scope of this invention, or whenever such lifting of the axle is necessary.

While I have described and illustrated several embodiments of my invention, it will be apparent to those skilled in the art that various changes, additions, omissions and substitutions may be made without departing from the spirit and scope of my invention, as set forth in the accompanying claims.

Having thus described my invention, what I claim and desire to secure by Letters Patent is:

1. A lifting and traversing device for a vehicle, said device including an auxiliary shaft, an auxiliary wheel mounted on one end of said shaft, said shaft being rigidly secured to said vehicle to support said auxiliary wheel in its inactive position by the resiliency of said auxiliary shaft.

2. A lifting and traversing device for a vehicle having a rear axle, said device including an auxiliary wheel, said auxiliary wheel mounted on an auxiliary axle shaft, said axle shaft forming the spindle for said auxiliary wheel, one end of said auxiliary axle shaft pivoted to said rear axle.

3. A raising and lowering device for a wheeled vehicle having a main axle and wheel assembly associated therewith comprising in combination, an auxiliary wheel, an axle for said auxiliary wheel, a support for said auxiliary axle pivotally connected to said main axle, means to swing said support about said pivot to raise and lower said auxiliary wheel, a gear carried by and rotatable with said main axle, and a cooperating gear carried by said auxiliary axle and disposed to mate with said first gear.

4. Raising and lowering mechanism for a wheeled vehicle having a main axle and wheel assembly associated therewith comprising in combination an auxiliary wheel, an auxiliary axle for said auxiliary wheel, a support for said auxiliary axle pivotally connected to said main axle, a gear carried by and rotatable with said main axle, and a cooperating gear carried by said auxiliary axle and disposed to mate with said first gear.

5. Raising and lowering mechanism for a wheeled vehicle having a main axle and wheel assembly associated therewith comprising in combination an auxiliary wheel, an auxiliary axle for said auxiliary wheel, a support for said auxiliary axle pivotally connected to said main axle, spring means urging said support in a direction to raise said auxiliary wheel, and additional means for moving said support about said pivot to lower said auxiliary wheel.

6. Raising and lowering mechanism for a wheeled vehicle having a main axle and wheel assembly associated therewith comprising in combination an auxiliary wheel, means for supporting said auxiliary wheel for pivotal raising and lowering movement about a center substantially coincident with the axis of said main axle, a driving connection between said main axle and said auxiliary wheel, and means engageable with said support and operable to effect a pivotal movement of said auxiliary wheel.

7. In a raising and lowering mechanism for wheeled vehicles comprising an auxiliary wheel, an axle therefor, the combination of means for raising and lowering said axle including a lever pivotally connected to said vehicle and having a part formed to encircle said axle and slide therealong to effect said movement of said auxiliary wheel.

8. Raising and lowering mechanism for a wheeled vehicle comprising in combination a resilient axle element connected at one end to said vehicle, an auxiliary wheel journalled on said axle adjacent the other end thereof, and means to deflect said axle element to raise or lower said auxiliary wheel with respect to said vehicle.

9. Raising and lowering mechanism for a wheeled vehicle having a main axle and wheel assembly associated therewith comprising in combination an auxiliary wheel, an auxiliary axle for said auxiliary wheel, means for supporting said auxiliary axle upon said vehicle, a gear carried by and rotatable with said main axle, and a cooperating gear carried by said auxiliary axle and disposed to mate with said first gear.

10. A raising and lowering device for a wheeled vehicle having at least one main wheel, an axle, and a driving means therefor, said device including an auxiliary wheel, a shaft for said auxiliary wheel, drive means carried by said axle and shaft respectively and disposed in driving engagement with each other, means securing said auxiliary wheel and shaft to said vehicle to provide for raising and lowering movements of said auxiliary wheel, said securing means being constructed and arranged to cause said auxiliary wheel to bodily move about the axis of said axle as a center so that the axis of said auxiliary shaft intersects the axis of said axle during said movements so as to maintain said driving engagement during said movements.

11. A lifting and traversing device for a vehicle having supporting wheels and a drive means for at least one of said wheels, comprising an auxiliary wheel and a shaft therefor, means supporting said auxiliary wheel and shaft on said vehicle so that said auxiliary wheel is movable toward and away from the roadway, a single gear carried by said auxiliary shaft and adapted to mesh with said driving means so as to axially rotate said auxiliary wheel, said supporting means being constructed and arranged to cause said gear to remain in said meshing relation continuously during said raising and lowering movements.

BROOKS WALKER.

Reissue No. 20,707 Granted April 26, 1938

BROOKS WALKER

The above entitled patent was extended July 24, 1951, under the provisions of the act of June 30, 1950, for 6 years and 214 days from the expiration of the original term thereof.

*Commissioner of Patents.*